US 6,652,059 B2

(12) United States Patent
Tsutsumi

(10) Patent No.: US 6,652,059 B2
(45) Date of Patent: Nov. 25, 2003

(54) IMAGE PROCESSING APPARATUS AND IMAGE PROCESSING METHOD

(75) Inventor: Shohei Tsutsumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/252,562

(22) Filed: Sep. 24, 2002

(65) Prior Publication Data

US 2003/0058303 A1 Mar. 27, 2003

(30) Foreign Application Priority Data

Sep. 27, 2001 (JP) ........................................ 2001-297446
Jul. 10, 2002 (JP) ........................................ 2002-201147

(51) Int. Cl.[7] .......................... B41J 2/65; B41J 29/393
(52) U.S. Cl. ........................................ 347/15; 347/19
(58) Field of Search .............................. 347/15, 19, 43, 347/131; 358/167, 3.01; 382/237

(56) References Cited

U.S. PATENT DOCUMENTS

| 5,258,854 A | * 11/1993 | Eschbach ............... 358/445 |
| 5,729,625 A | * 3/1998 | Miyake ................. 382/169 |
| 5,949,965 A | 9/1999 | Gondek ................. 358/1.9 |
| 5,973,803 A | 10/1999 | Cheung et al. .......... 358/534 |
| 6,363,172 B1 | 3/2002 | Cheung et al. .......... 382/167 |

OTHER PUBLICATIONS

Floyd et al., "An Adaptive Algorithm for Spatial Greyscale," Proceedings of the Society for Information Display, vol. 17, No. 2, Second Quarter 1976, pp. 75–77.

* cited by examiner

*Primary Examiner*—Thinh Nguyen
(74) *Attorney, Agent, or Firm*—Fitzpatrick, Cella, Harper & Scinto

(57) ABSTRACT

In a printing apparatus which performs printing by moving a printhead having a plurality of printing elements arrayed in a predetermined direction, relatively to a printing medium, whether input pixel data is pixel data to be printed by a printing element which cannot print normally is determined. Input multilevel data of each pixel is converted into data of a smaller number of gray levels than the number of input gray levels. The difference between input data and quantized data of a pixel of interest is diffused to pixels around the pixel of interest. In quantization, the pixel data determined to be printed by the printing element which cannot print normally undergoes quantization processing different from that for other pixel data. Accordingly, a high-quality image can be printed even in printing using a printhead with a printing element which cannot print normally.

41 Claims, 16 Drawing Sheets

FIG. 9A
FIG. 9B
FIG. 9C
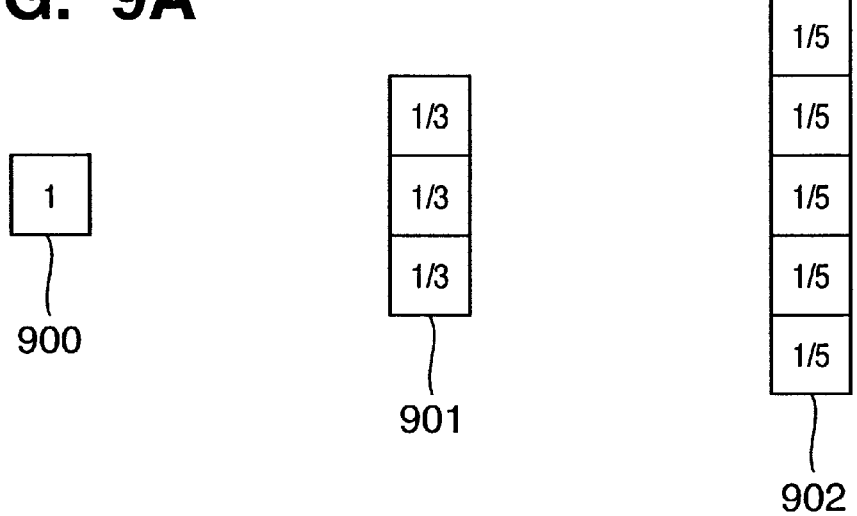
FIG. 9D
FIG. 9E
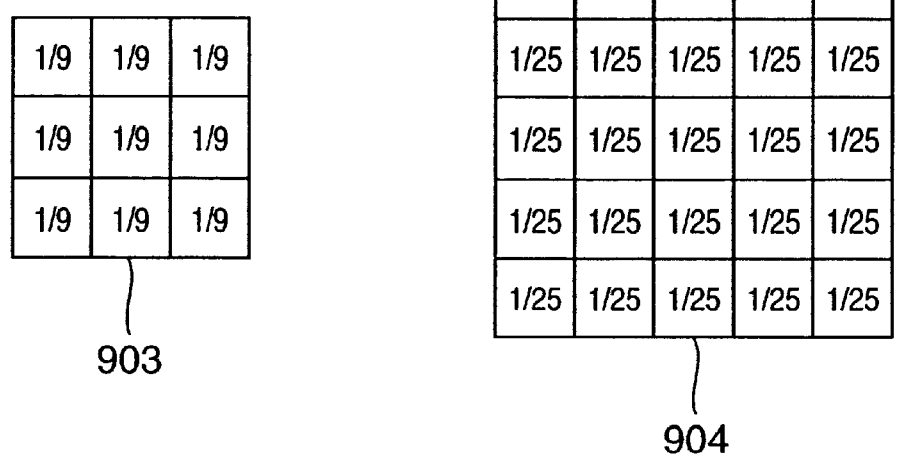

FIG. 10A
FIG. 10B
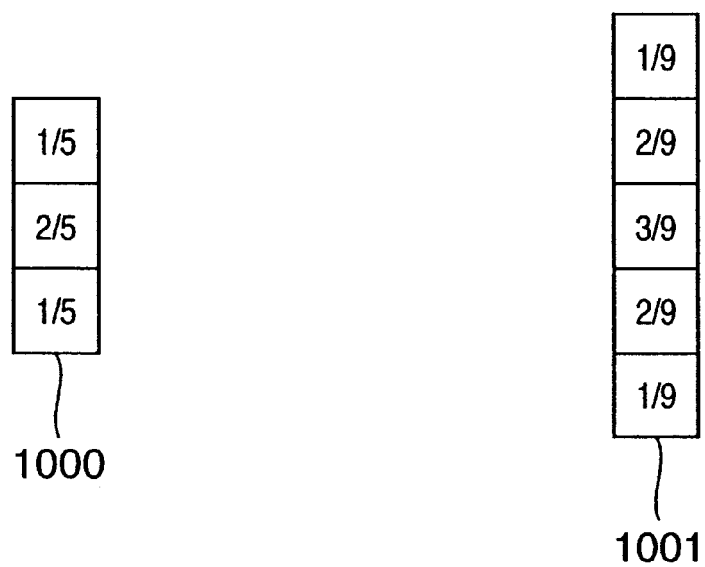
FIG. 10C
FIG. 10D
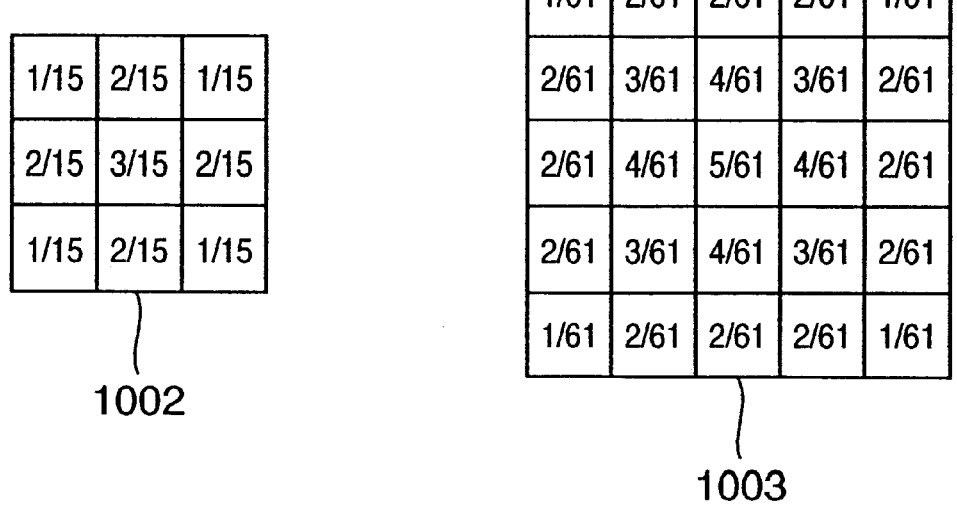

IMAGE PROCESSING APPARATUS AND IMAGE PROCESSING METHOD

FIELD OF THE INVENTION

The present invention relates to an image processing apparatus and image processing method and, more particularly, to image processing of converting data of each pixel into data of a smaller number of gray levels than the number of input gray levels in a printing apparatus which performs printing by moving a printhead having a plurality of printing elements arrayed in a predetermined direction, relatively to a printing medium.

BACKGROUND OF THE INVENTION

As an information output apparatus for a wordprocessor, personal computer, facsimile apparatus, or the like, a printing apparatus which prints information such as a desired character or image on a sheet-like printing medium such as a paper sheet or film may use various methods. Of these methods, a method of applying a printing agent to a printing medium to form text or an image on the printing medium is put into practical use. A typical example of this type is an ink-jet printing apparatus. Recently, ink-jet printing apparatuses are attaining higher performance, and can print not only text but also images.

For higher printing speeds and higher image quality, the ink-jet printing apparatus uses a nozzle group constructed by packing and arraying a plurality of ink orifices (nozzles) capable of discharging ink of the same color at the same density. Such nozzle groups are generally arranged for ink of the same color at different densities or inks of different colors. Some apparatuses can discharge ink by changing stepwise the discharge amount of ink of the same color at the same density.

The printhead having these nozzle groups is moved relative to a printing medium, and discharges ink from the nozzles to print.

To print an image, a halftone processing method such as dithering or error diffusion is employed as a method of exactly reproducing the tone of image information. For example, an error diffusion method by R. Floyd ("An adaptive algorithm for spatial gray scale", SID International Symposium Digest of Technical Papers, vol. 4.3, 1975, pp. 36–37) is known as a method of converting multilevel image data into a binary image (or an image having the number of binary or higher gray levels which is smaller than the number of input gray levels). According to this error diffusion method, a binary error in a given pixel is diffused to subsequent pixels to realize a pseudo tone expression.

Error diffusion is widely adopted as a pseudo halftone processing method with high tone reproducibility in image processing apparatuses such as a printer, copying machine, and facsimile apparatus.

However, printing using error diffusion suffers from the following problem.

This problem will be described by exemplifying printing of an image by a serial printer such as an ink-jet printer in which a printhead having a plurality of nozzles arrayed in a predetermined direction scans a printing medium in a direction crossing to the nozzle array direction, and ink is discharged onto the printing medium to form an image.

A plurality of nozzles which discharge ink droplets (dots) include an (undischargeable) nozzle which cannot discharge dots under some influence, or a nozzle whose discharge dot volume does not reach a specified value. When using a large number of nozzles for a long nozzle array, there is a high probability of such abnormal nozzles being present.

FIG. 6 is a view showing a process of forming an image by one scanning operation of one image array (raster) using one nozzle array. Reference numeral 60 denotes a nozzle in a good discharge state; 61, an unprintable nozzle which cannot discharge dots; 62, a binarization result by an error diffusion method; and 63, a dot printing state.

When an image is formed by one scanning operation, no dot can be printed on a printing medium in a raster corresponding to an unprintable nozzle, as shown in FIG. 6. If dots must be formed in the raster corresponding to the unprintable nozzle by binarization processing complying with a conventional error diffusion method, an image around the dots is formed from dots smaller in number than dots which should be actually printed. In other words, density conservation as one of advantages of error diffusion cannot be fully achieved, greatly degrading the printing image quality.

SUMMARY OF THE INVENTION

It is an object of the present invention to provide an image processing apparatus capable of printing a high-quality image even when printing using a printhead having a printing element which cannot print normally.

It is another object of the present invention to provide an image processing method capable of printing a high-quality image even when printing using a printhead having a printing element which cannot print normally.

According to the first aspect of the present invention, the above object is attained by an image processing apparatus for a printing apparatus which performs printing by moving a printhead having a plurality of printing elements arrayed in a predetermined direction, relatively to a printing medium, comprising: determining means for determining whether input pixel data is pixel data to be printed by a printing element which cannot print normally; quantizing means for converting input multilevel data of each pixel into data of a smaller number of gray levels than the number of input gray levels; and error diffusing means for diffusing a difference between input data and data quantized by said quantizing means for a pixel of interest to pixels around the pixel of interest, wherein the quantizing means performs, for the pixel data determined by the determining means to be printed by the printing element which cannot print normally, quantization processing different from quantization processing for other pixel data.

According to the first aspect of the present invention, another object is attained by an image processing method for a printing apparatus which performs printing by moving a printhead having a plurality of printing elements arrayed in a predetermined direction, relatively to a printing medium, comprising: the determining step of determining whether input pixel data is pixel data to be printed by a printing element which cannot print normally; the quantizing step of converting input multilevel data of each pixel into data of a smaller number of gray levels than the number of input gray levels; and the error diffusing step of diffusing a difference between input data and data quantized in the quantizing step for a pixel of interest to pixels around the pixel of interest, wherein in the quantizing step, the pixel data determined in the determining step to be printed by the printing element which cannot print normally undergoes quantization processing different from quantization processing for other pixel data.

The above objects are also attained by a computer program which causes a computer to execute the image processing method, and a storage medium which stores the program.

More specifically, according to the first aspect of the present invention, in a printing apparatus which performs printing by moving a printhead having a plurality of printing elements arrayed in a predetermined direction, relatively to a printing medium, whether input pixel data is pixel data to be printed by a printing element which cannot print normally is determined. Input multilevel data of each pixel is converted into data of a smaller number of gray levels than the number of input gray levels. The difference between input data and quantized data of a pixel of interest is diffused to pixels around the pixel of interest. In quantization, the pixel data determined to be printed by the printing element which cannot print normally undergoes quantization processing different from that for other pixel data.

The pixel data determined to be printed by the printing element which cannot print normally undergoes processing different from that for other pixel data, e.g., processing of adding the data to an error applied to neighboring pixels. As a result, the pixel data can be diffused to neighboring pixels.

Even in printing using a printhead with a printing element which cannot print normally, the total of pixel data around the pixel of interest is equal to input data. A high-quality image maintaining information included in an input image can be printed.

Preferably, the quantizing means converts the pixel data determined by the determining means to be printed by the printing element which cannot print normally into data representing non-printing.

Preferably, the apparatus further comprises filter means for performing a predetermined filter process for input pixel data before input to said quantizing means.

In this case, the apparatus may further comprise a user interface for allowing a user to select the predetermined filter process from a plurality of filter processes.

Preferably, the filter means performs the predetermined filter process for pixels around the pixel determined to be subjected to printing by the printing element which cannot print normally.

The plurality of filter processes may be different in at least one of a range for performing the predetermined filter process and a filter characteristic.

The apparatus may further comprises filter storage means for storing parameters of the plurality of filter processes.

Preferably, the apparatus further comprises detecting means for detecting the printing element which cannot print normally.

The detecting means may detect the printing element which cannot print normally on the basis of a driving result of each printing element or on the basis of a printing result on a printing medium by each printing element.

According to the second aspect of the present invention, the above object is attained by an image processing apparatus for a printing apparatus which performs printing by moving a printhead having a plurality of printing elements arrayed in a predetermined direction, relatively to a printing medium, comprising: determining means for determining whether input pixel data is data of a pixel to be printed by a printing element which cannot print normally; quantizing means for converting input multilevel data of each pixel into data of a smaller number of gray levels than the number of input gray levels; and error diffusing means for diffusing a difference between input data and data quantized by the quantizing means for a pixel of interest to pixels around the pixel of interest, wherein the quantizing means performs, for data of a pixel neighboring the pixel determined by the determining means to be subjected to printing by the printing element which cannot print normally, quantization processing different from quantization processing for other pixel data.

According to the second aspect of the present invention, another object is attained by an image processing method for a printing apparatus which performs printing by moving a printhead having a plurality of printing elements arrayed in a predetermined direction, relatively to a printing medium, comprising: the determining step of determining whether input pixel data is data of a pixel to be printed by a printing element which cannot print normally; the quantizing step of converting input multilevel data of each pixel into data of a smaller number of gray levels than the number of input gray levels; and the error diffusing step of diffusing a difference between input data and data quantized in the quantizing step for a pixel of interest to pixels around the pixel of interest, wherein in the quantizing step, data of a pixel neighboring the pixel determined in the determining step to be subjected to printing by the printing element which cannot print normally undergoes quantization processing different from quantization processing for other pixel data.

The above objects are also achieved by a computer program which causes a computer to execute the image processing method, and a storage medium which stores the program.

More specifically, according to the second aspect of the present invention, in a printing apparatus which performs printing by moving a printhead having a plurality of printing elements arrayed in a predetermined direction, relative to a printing medium, whether input pixel data is data of a pixel to be printed by a printing element which cannot print normally is determined. Input multilevel data of each pixel is converted into data of a smaller number of gray levels than the number of input gray levels. The difference between input data and quantized data of a pixel of interest is diffused to pixels around the pixel of interest. In quantization, data of a pixel neighboring the pixel determined to be printed by the printing element which cannot print normally undergoes quantization processing different from that for other pixel data.

Pixel data neighboring unprintable pixel data determined to be printed by the printing element which cannot print normally undergoes processing different from that for other pixel data, e.g., processing of increasing the number of dots to be printed. This can relax an abrupt decrease in density caused by the unprintable pixel data.

Even when printing using a printhead with a printing element which cannot print normally, an abrupt decrease in density by the unprintable pixel data can be relaxed. A high-quality image almost free from blank stripes can be printed.

Preferably, the quantizing means comprises threshold varying means for varying a quantization threshold for data of the neighboring pixel.

The threshold varying means may vary the threshold so as to increase the number of printing dots to the neighboring pixel.

Preferably, the apparatus further comprises a user interface for allowing a user to select a parameter used by said threshold varying means.

The parameter may include an applicable range of threshold varying processing, a threshold varying strength, and whether to refer to an input pixel value in threshold setting.

The threshold varying means may define a threshold varying amount by referring to input pixel data.

Preferably, the apparatus further comprises detecting means for detecting the printing element which cannot print normally.

The detecting means detects the printing element which cannot print normally, on the basis of a driving result of each printing element, or on the basis of a printing result on a printing medium by each printing element.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 9A to 9E are views showing examples of a filter for performing filtering;

FIGS. 10A to 10D are views showing other examples of the filter for performing filtering;

DETAILED DESCRIPTION OF THE PREFERRED EMBODIMENTS

Preferred embodiments of the present invention will now be described in detail in accordance with the accompanying drawings.

The following embodiments will exemplify an image processing apparatus for a serial printing apparatus using an ink-jet printing method in which a printhead having a plurality of nozzles arrayed in a predetermined direction scans a printing medium in a direction crossing to the nozzle array direction, and ink is discharged onto the printing medium to form an image.

First Embodiment

Figure 1:
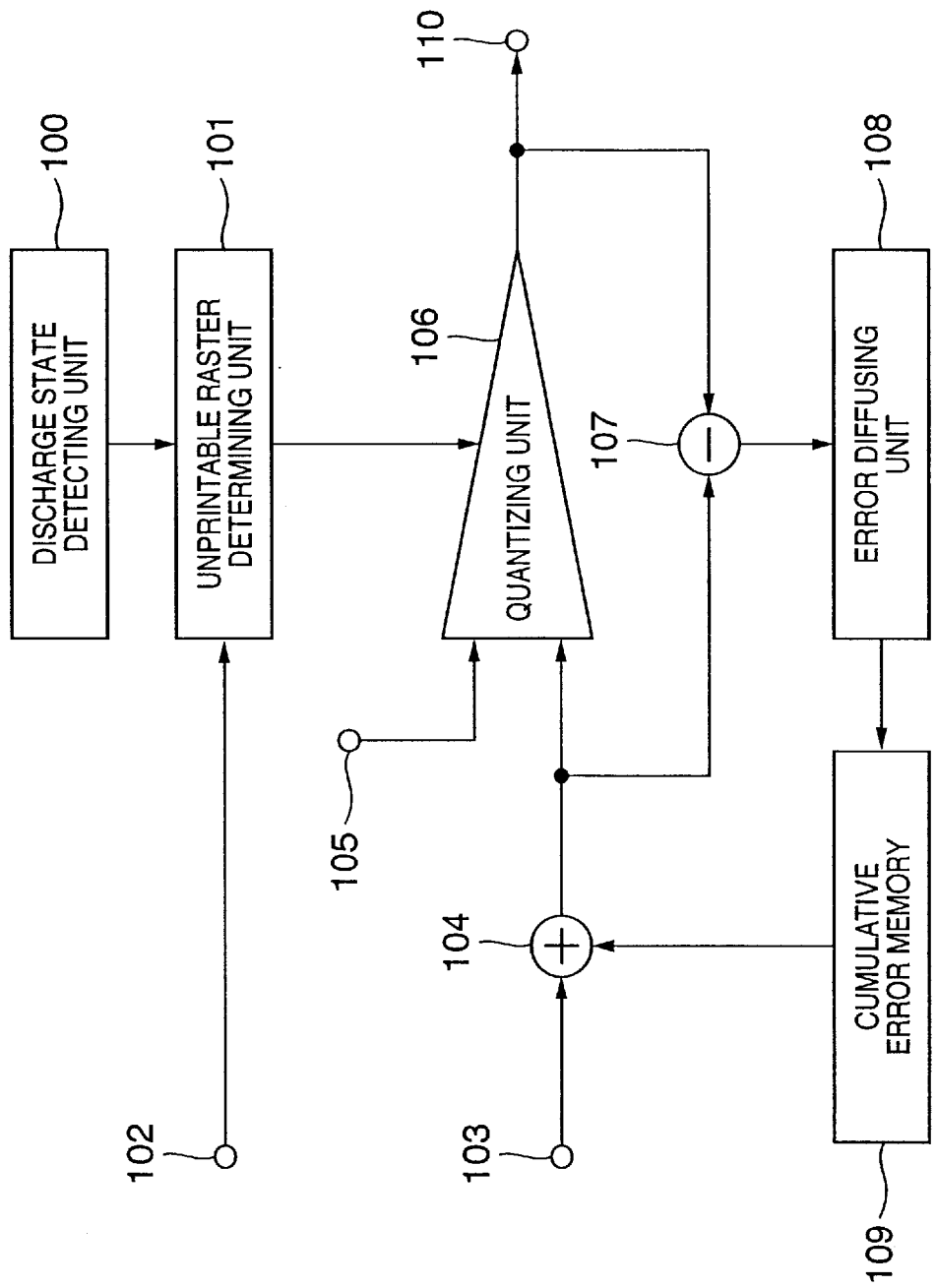
FIG. 1 is a block diagram showing the arrangement of an image processing apparatus according to the first embodiment of the present invention.

FIG. 1 is a block diagram showing the arrangement of an image processing apparatus according to the first embodiment of the present invention. Reference numeral 100 denotes a discharge state detecting unit; 101, an unprintable raster determining unit; 102, an address input terminal; 103, a pixel data input terminal; 104, a cumulative error adding unit; 105, a threshold setting terminal which sets a quantization threshold; 106, a quantizing unit; 107, an error calculating unit which calculates a quantization error; 108, an error diffusing unit which diffuses a quantization error; 109, a cumulative error memory; and 110, an output terminal for image data formed by a series of processes.

Figure 2:
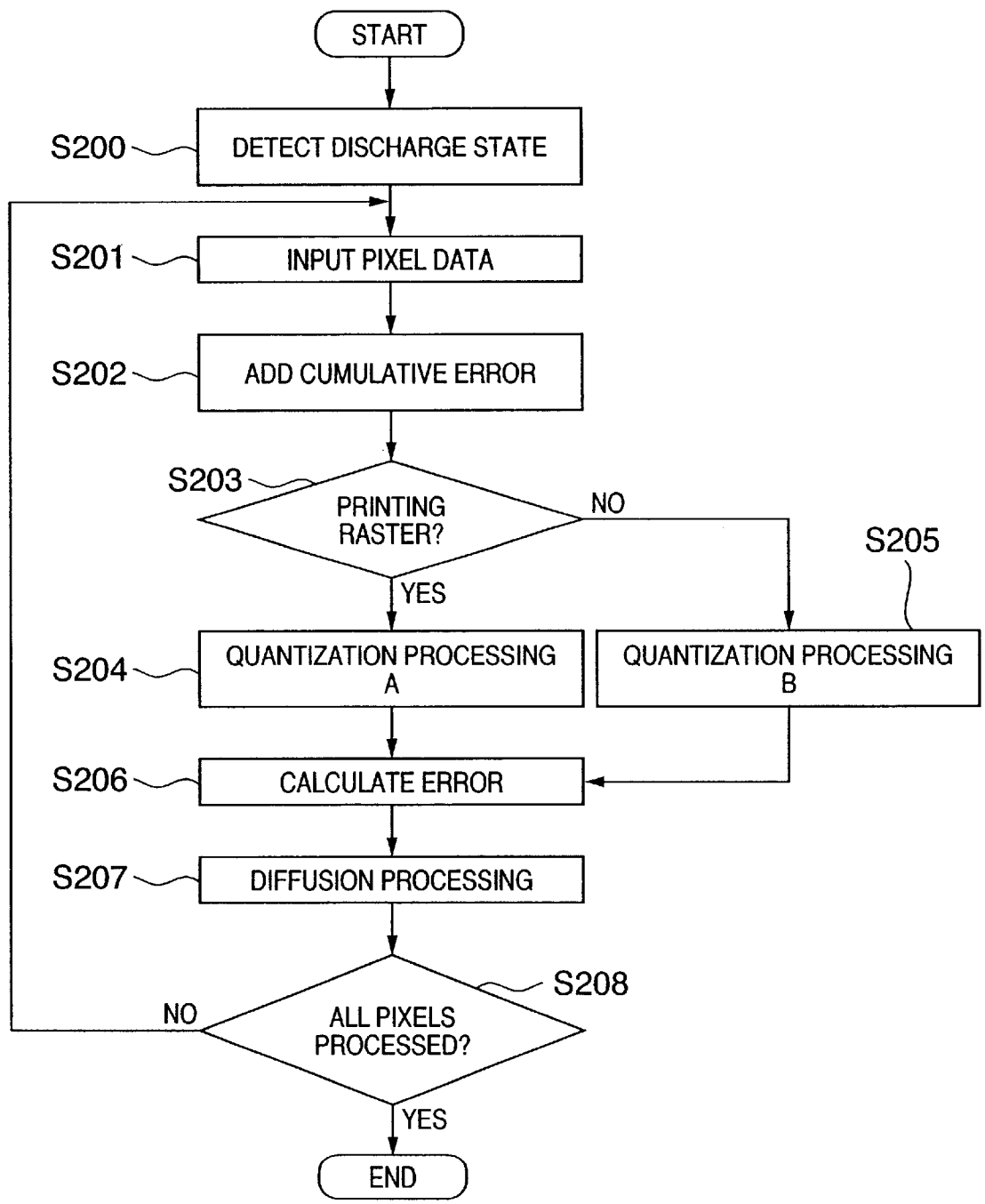
FIG. 2 is a flow chart showing processing in the image processing apparatus of FIG. 1.

The operation of the image processing apparatus in FIG. 1 will be explained with reference to the flow chart of FIG. 2.

The discharge state detecting unit detects the discharge state of each nozzle (step S200). At this time, an unprintable nozzle whose ink droplet discharge amount has not reached a specified value is detected. An image scanning unit (not shown) sequentially scans an input image, and each pixel data is input via the input terminal 103 (step S201).

Figure 3:
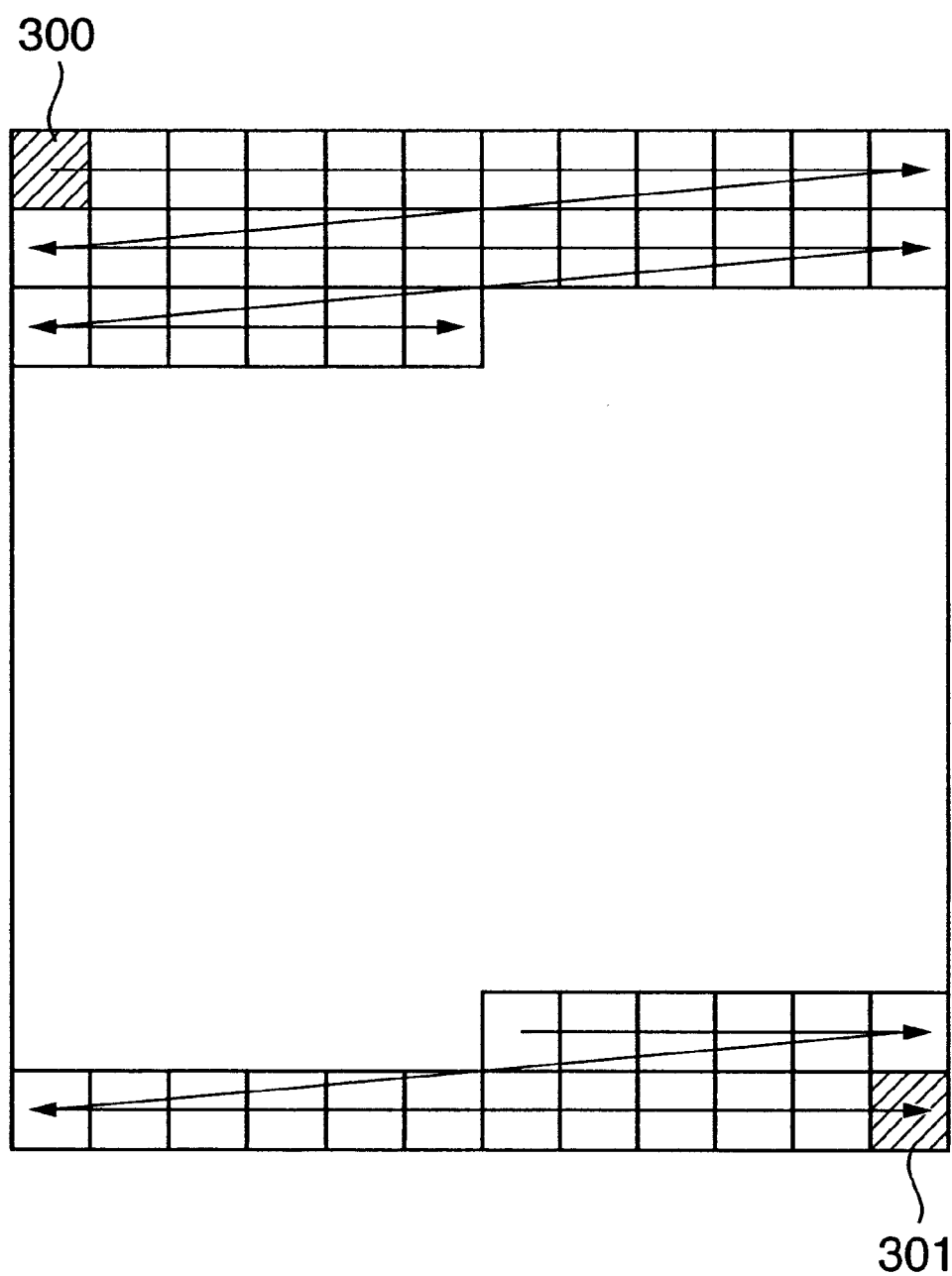
FIG. 3 is a view showing scanning of an input image.

FIG. 3 is a view showing scanning of an input image. Reference numeral 300 denotes a pixel at the upper left corner of the input image; and 301, a pixel at the lower right corner of the input image. Image scanning starts from the pixel 300 at the upper left corner of the image region, and shifts every pixel rightward. If scanning reaches the right end of the image data array, it shifts to a pixel at the left end of an image data array lower by one pixel. Processing is repeated in this way, and if reaches the pixel 301 at the lower right corner, image scanning processing ends.

The cumulative error adding unit 104 adds, to the input pixel data, a cumulative error value corresponding to a pixel position of the cumulative error memory (step S202). The cumulative error memory has one storage area E0, and storage areas E(x) equal in number to horizontal pixels W of an input image. The cumulative error memory stores a quantization error by a method to be described later. The cumulative error memory is completely initialized with a default value "0" before the start of processing.

Figure 4:
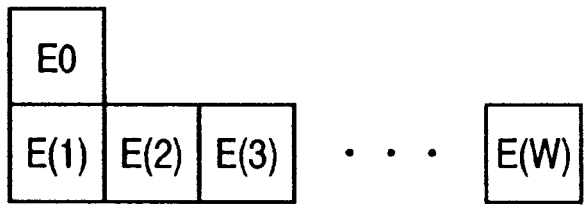
FIG. 4 is a view showing details of contents stored in a cumulative error memory.

FIG. 4 is a view showing details of contents stored in the cumulative error memory. The cumulative error adding unit 104 adds the value of an error memory E(x) corresponding to a horizontal pixel position x of input pixel data. That is, the value of pixel data I' after adding a cumulative error to input pixel data I is given by $$I'=I+E(x)$$

Then, the unprintable raster determining unit 101 refers to the raster number of an image input from the address input terminal 102, and checks whether the raster of interest is an image-formable raster (step S203). Letting L be the raster number of a raster of interest, N be the number of nozzles of a nozzle array, and Pi be an unprintable nozzle number, a raster which satisfies $$L \% N = Pi$$

is determined as a raster not subjected to image formation. "%" is an operator representing a modulo (remainder).

Figure 5:
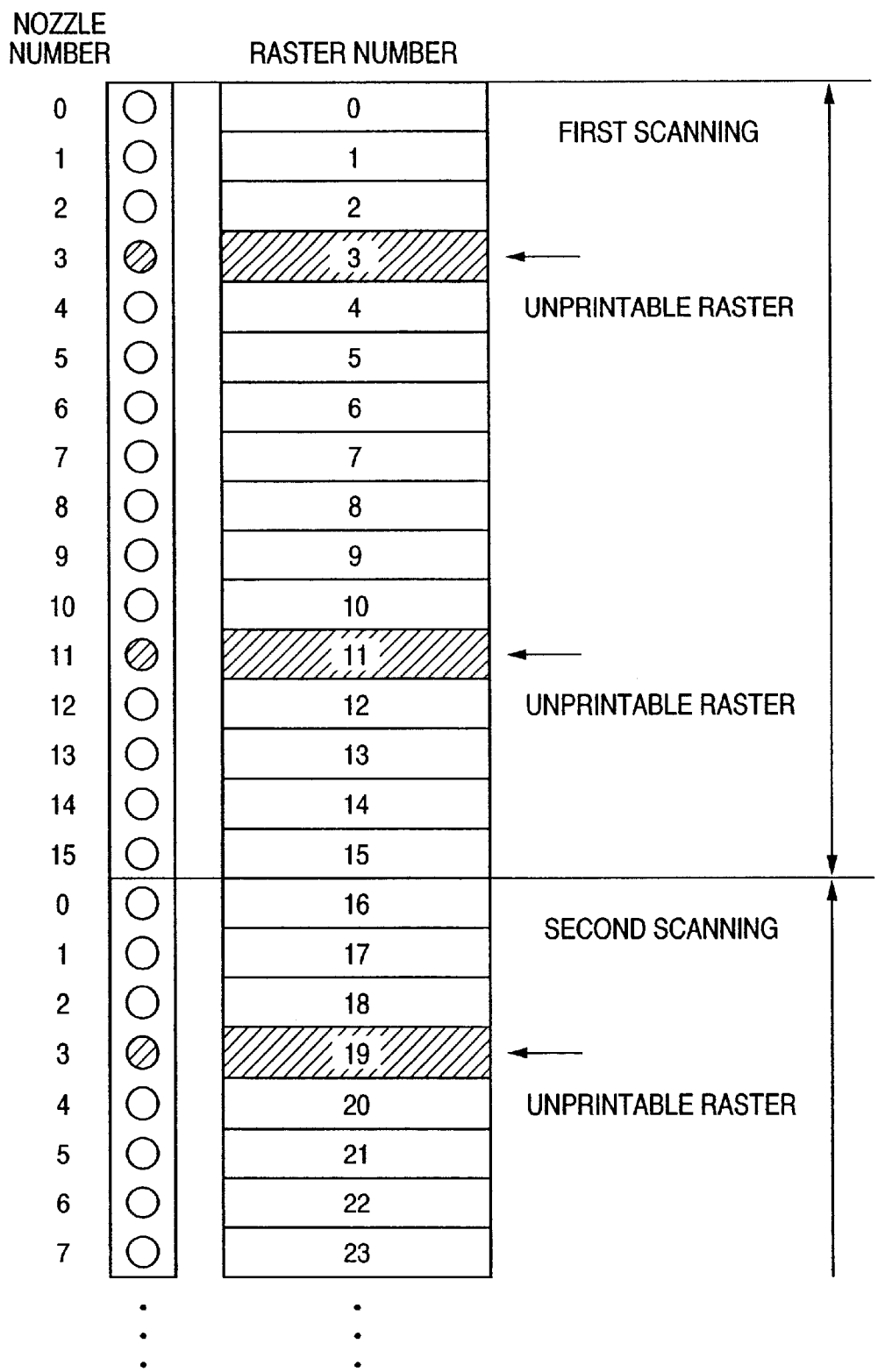
FIG. 5 is a view showing an image formation process in the use of a nozzle array including an unprintable nozzle.
Figure 6:
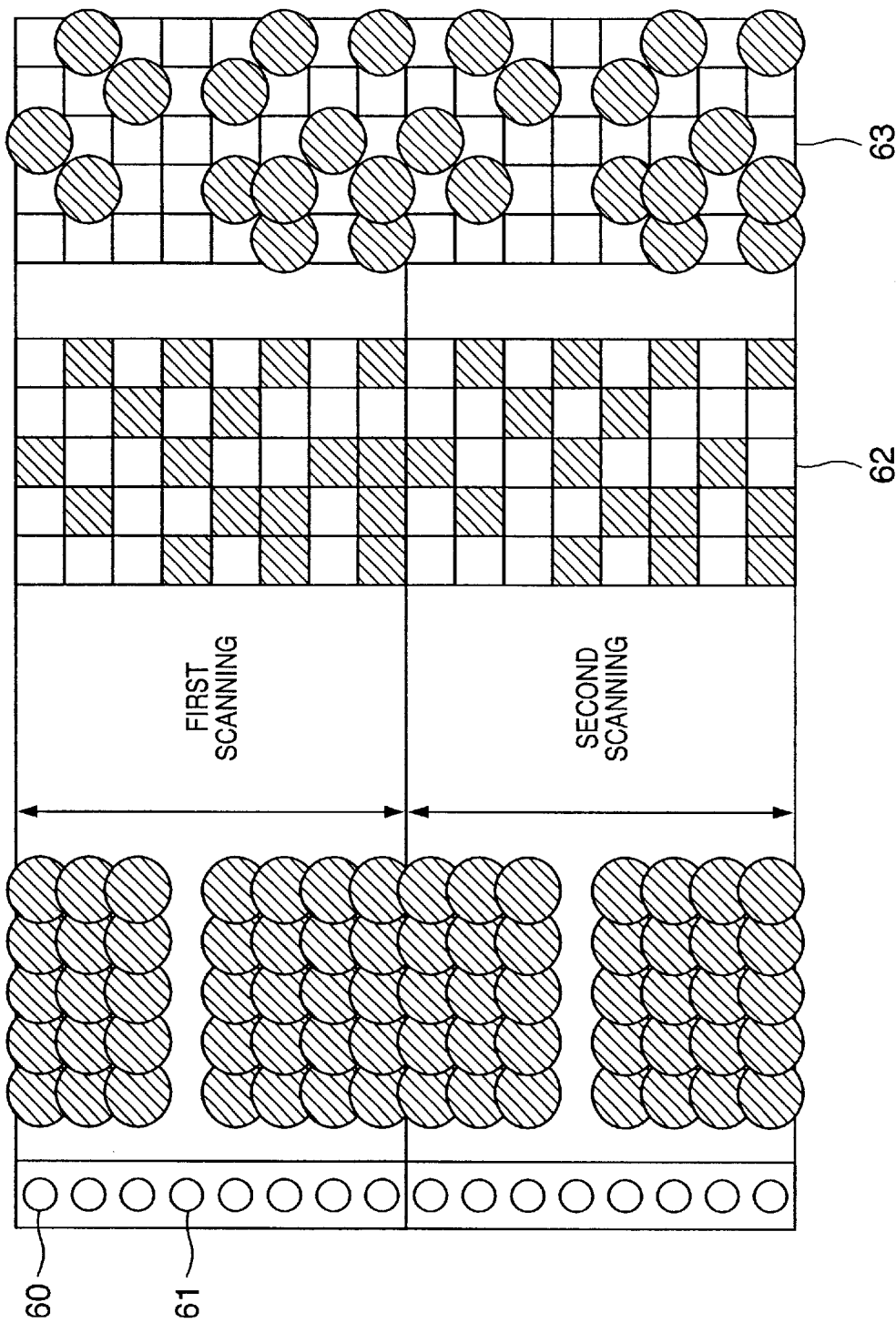
FIG. 6 is a view showing a process of forming an image by one scanning operation of one image array using one nozzle array.

FIG. 5 is a view showing an image formation process in the use of a nozzle array having the number N of nozzles=16 and unprintable nozzle numbers P0=3 and P1=11. As shown in FIG. 5, rasters with output image raster numbers L=3, 11, 19, . . . . are determined as rasters not subjected to image formation.

If the raster of interest is determined as an image-formable raster, the quantizing unit 106 performs first quantization processing A (step S204). If the raster of interest is determined as a raster not subjected to image formation, the quantizing unit 106 performs second quantization processing B (step S205).

Each quantization processing will be described in detail. In the first quantization processing A, pixel data I' upon addition of a cumulative error and a threshold set by the threshold setting terminal 105 are compared to determine an output pixel value. In the first embodiment, the output value after quantization is binary, and an output pixel value is determined by a comparison between one threshold and the pixel data I' upon addition of a cumulative error. Assuming that the input pixel value is an integer within the range of 0 to 255, an output tone value O is determined by $$O=0 \ (I'<128)$$

$$O=255 \ (I'=128 \text{ or } I'>128)$$

In the second quantization processing B, the output tone value O is $$O=255$$

such that the output tone value O represents an unprintable state regardless of the input pixel value. In the first embodiment, a dot is printed at a pixel position for an output value "0", and it is not printed at a pixel position for an output value "255".

The error calculating unit 107 calculates the difference between the pixel data I' upon addition of a cumulative error and the output pixel value O, i.e., a quantization error Err by $$Err=I'-O$$

(step S206).

The error diffusing unit 108 performs error diffusion processing in accordance with the horizontal position x of the pixel of interest so as to attain $$E(x+1) \rightarrow E(x+1)+E \times 7/16 \qquad (x<W)$$

$$E(x-1) \rightarrow E(x-1)+E \times 3/16 \qquad (x>1)$$

$$E(x) \rightarrow E0+E \times 5/16 \qquad (1<x<W)$$

$$E(x) \rightarrow E0+E \times 8/16 \qquad (x=1)$$

$$E(x) \rightarrow E0+E \times 13/16 \qquad (x=W)$$

$$E0 \rightarrow E \times 1/16 \qquad (x<W)$$

$$E0 \rightarrow 0 \qquad (x=W)$$

(step S207).

In this manner, error diffusion processing for one pixel of the input image is completed. Whether error diffusion processing has been performed for all the pixels of the input image is checked (step S208). If YES in step S208, pseudo halftone processing of the input image is completed.

In the first embodiment, the discharge state detecting unit checks the ink droplet discharge amount of each nozzle to detect an unprintable nozzle. The discharge state detecting unit may detect an unprintable nozzle by giving attention to the printing area of an ink droplet discharged from each nozzle onto a printing medium.

As described above, according to the first embodiment, printing of dots is forcibly inhibited for a raster in which image formation cannot be executed under the influence of an unprintable nozzle. As a result, a high-quality output image can be provided without degrading the input image data density conservation characteristic as an advantage of the error diffusion method.

Second Embodiment

An image processing apparatus according to the second embodiment of the present invention will be described. In the following description, a description of the same part as that of the first embodiment will be omitted, and the characteristic feature of the second embodiment will be mainly explained.

Figure 7:
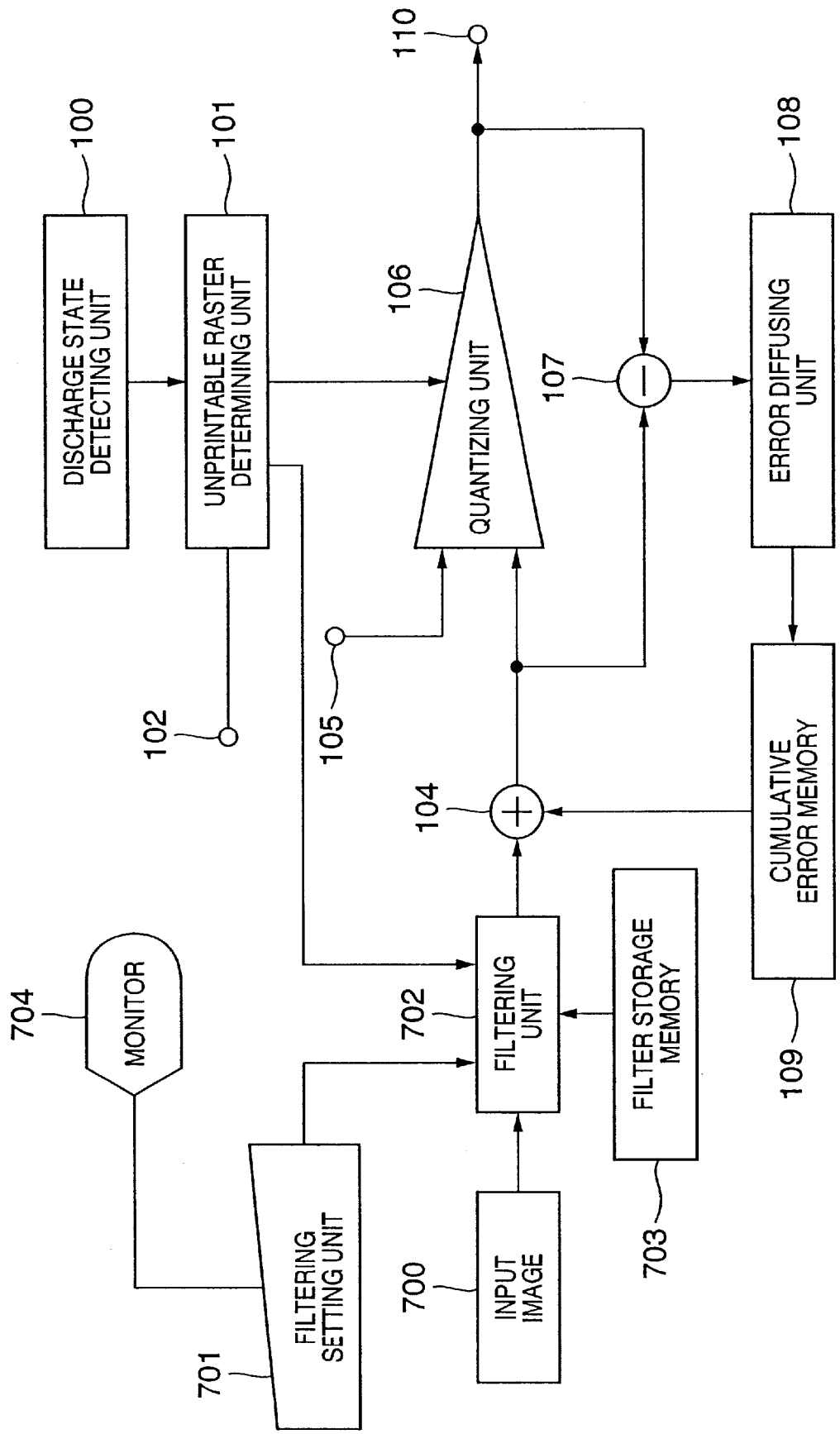
FIG. 7 is a block diagram showing the arrangement of an image processing apparatus according to the second embodiment of the present invention.

FIG. 7 is a block diagram showing the arrangement of the image processing apparatus according to the second embodiment of the present invention. A filtering setting unit 701 which allows the user to perform filtering setting, a filtering unit 702 which performs filtering processing for an input image in accordance with the filtering setting, a filter storage memory 703 which stores a filter used for filtering, and a monitor 704 for filtering setting are added to the arrangement of the first embodiment shown in FIG. 1. An input image 700 having 8-bit grayscale information per pixel is input as an input image.

Figure 8:
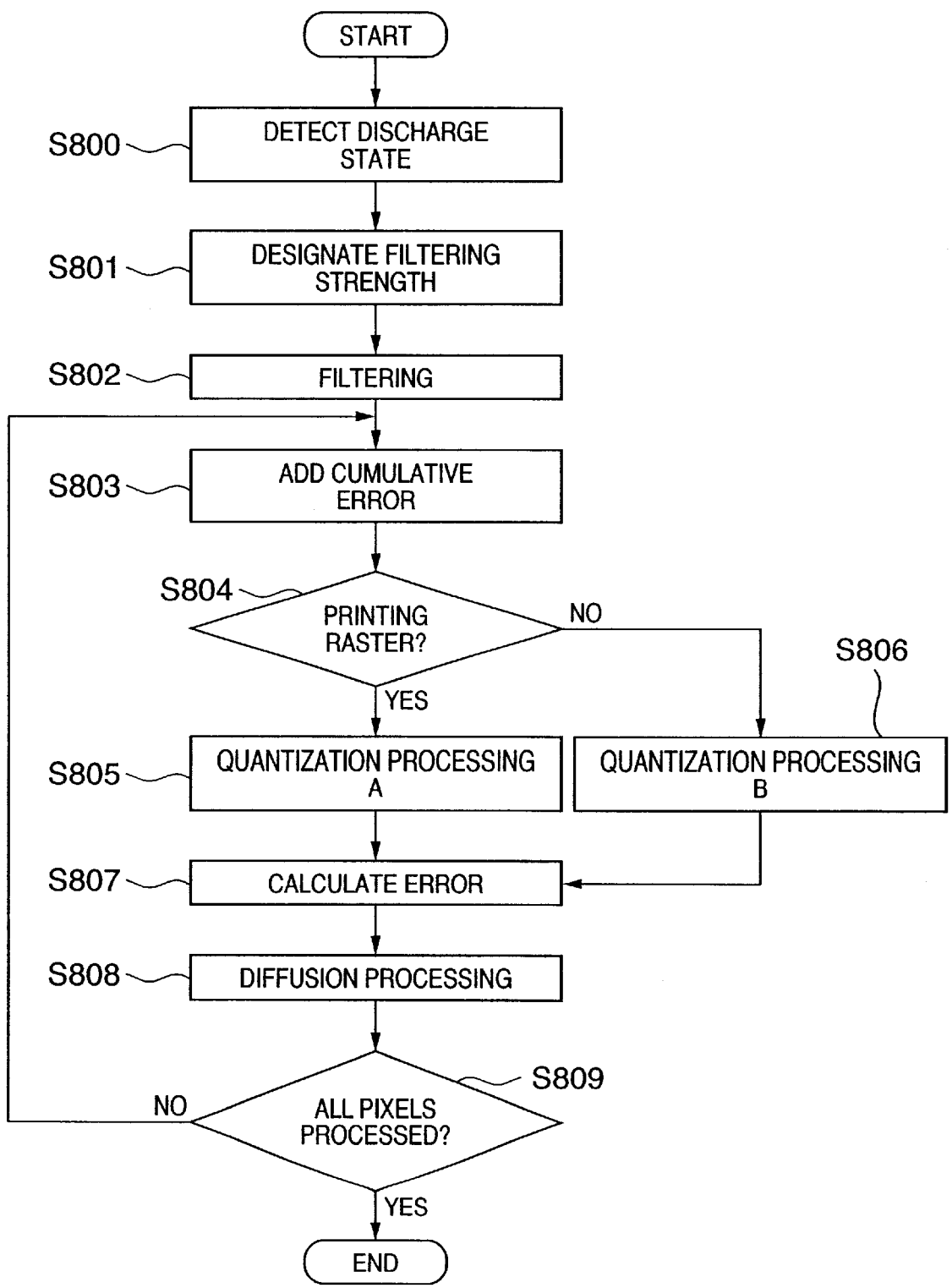
FIG. 8 is a flow chart showing processing in the image processing apparatus of FIG. 7.

The operation of the image processing apparatus in FIG. 7 will be explained with reference to the flow chart of FIG. 8.

A discharge state detecting unit detects the discharge state of each nozzle (step S800). At this time, an unprintable nozzle whose ink droplet discharge amount has not reached a specified value is detected. Then, the user designates the strength of filtering processing performed for an input image, the size of a target region, and a filter characteristic in the filtering setting unit 701 (step S801).

Figure 11:
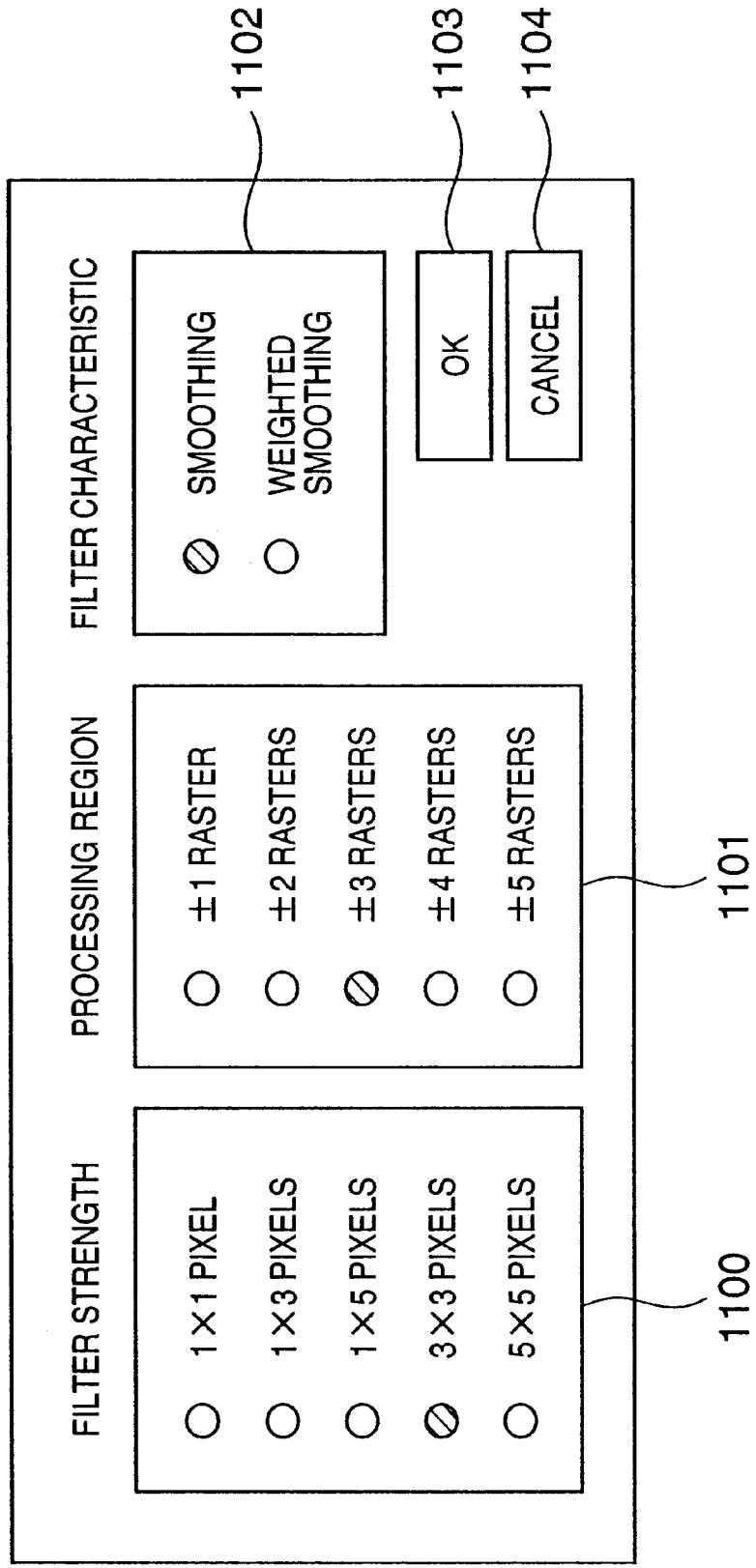
FIG. 11 is a view showing a user interface window for performing filtering setting.

FIG. 11 shows an example of a user interface window used to designate these setting parameters. The user interface window is displayed on the monitor 704. Reference numeral 1100 denotes a filter strength designating portion; 1101, a filtering processing region designating portion; 1102, a filter characteristic designating portion; 1103, a filtering setting determining portion; and 1104, a filtering setting re-execution determining portion. A filter to be used from the filter storage memory is determined in accordance with a filtering strength and filter characteristic designated by the user on the user interface window.

Filtering processing is performed for only a filtering processing region designated by the user in a raster near an image array not subjected to image printing that is designated by the unprintable raster determining unit (step S802).

FIGS. 9A to 9E show examples of filters corresponding to various strengths displayed on the user interface window in FIG. 11. In any filters, the center corresponds to a pixel position subjected to processing, and the value in each square is a correction coefficient. A filter 900 shown in FIG. 9A has a filter size of 1×1 pixel with strength 1. A filter 901 shown in FIG. 9B has a filter size of 1×3 pixels with strength 2. A filter 902 shown in FIG. 9C has a filter size of 1×5 pixels with strength 3. A filter 903 shown in FIG. 9D has a filter size of 3×3 pixels with strength 3. A filter 904 shown in FIG. 9E has a filter size of 5×5 pixels with strength 4. The filtering effect is the weakest (no effect) in the filter 900, and the filtering effect (correction strength) increases in the order of the filter 901 to the filter 904.

Assume, for example, that the filter 903 with correction strength 3 is selected, and the filtering method calculates the average of a pixel to be processed and eight pixels around the pixel to be processed. Then, letting G(x,y) be the pixel value of a pixel position (x,y), a pixel value G'(i,j) after filter correction with respect to a pixel position (i,j) subjected to processing is given by $$G'(i,j)=\{G(i-1,j-1)+G(i,j-1)+G(i+1,j-1)+G(i-1,j)+G(i,j)+G(i+1,j)+G(i-1,j+1)+G(i,j+1)+G(i+1,j+1)\}/9$$

In the second embodiment, correction processing is executed for only +/−3 rasters in an image array in which image printing is not performed, in accordance with a processing region size designated by the filtering setting unit 701. No filtering processing is executed for another image array.

A cumulative error adding unit 104 adds, to input pixel data, a cumulative error value corresponding to a pixel position of a cumulative error memory (step S803). The cumulative error memory has one storage area E0, and storage areas E(x) equal in number to horizontal pixels W of an input image. The cumulative error memory stores a quantization error by a method to be described later. Details of contents stored in the cumulative error memory are the same as those of the first embodiment shown in FIG. 4. The cumulative error memory is completely initialized with a default value "0" before the start of processing.

The cumulative error adding unit 104 adds the value of an error memory E(x) corresponding to a horizontal pixel position x of input pixel data. Letting I' be pixel data after adding a cumulative error, input pixel data I is given by $$I'=I+E(x)$$

An unprintable raster determining unit 101 refers to the raster number of an image input from an address input terminal 102, and checks whether the raster of interest is an image-formable raster (step S804). Letting L be the raster number of a raster of interest, N be the number of nozzles of a nozzle array, and Pi be an unprintable nozzle number, a raster which satisfies $$L\%N=Pi$$

is determined as a raster not subjected to image formation. "%" is an operator representing a modulo (remainder). The image formation process is the same as that of the first embodiment shown in FIG. 5.

If the raster of interest is determined as an image-formable raster, a quantizing unit 106 performs first quantization processing A (step S805). If the raster of interest is determined as a raster in which image formation is not executed, the quantizing unit 106 performs second quantization processing B (step S806). Processing contents of the first and second quantization processes A and B are the same as those of the first embodiment, and a detailed description thereof will be omitted.

An error calculating unit 107 calculates the difference between the pixel data I' upon addition of a cumulative error and the output pixel value O, i.e., a quantization error Err (step S807). This processing is the same as that of step S206 in the first embodiment.

An error diffusing unit 108 performs error diffusion processing in accordance with the horizontal position x of the pixel of interest (step S808). This processing is the same as that of step S207 in the first embodiment.

In this fashion, error diffusion processing for one pixel of the input image is completed. Whether error diffusion processing has been performed for all the pixels of the input image is checked (step S809). If YES in step S809, pseudo halftone processing of the input image is completed.

In the second embodiment, the discharge state detecting unit checks the ink droplet discharge amount of each nozzle to detect an unprintable nozzle. The discharge state detecting unit may detect an unprintable nozzle by giving attention to the printing area of an ink droplet discharged from each nozzle onto a printing medium.

The second embodiment executes filtering processing using the average of a pixel to be processed and eight pixels around the pixel to be processed. Instead, an average calculated by weighting of neighboring pixels may be adopted. As a weighting filter, filters with values as shown in FIGS. 10A to 10D can be used. In any filters, the central pixel corresponds to a pixel to be processed, and the value in each square is a correction coefficient. A filter 1000 shown in FIG. 10A has a filter size of 1×3 pixels. A filter 1001 shown in FIG. 10B has a filter size of 1×5 pixels. A filter 1002 shown in FIG. 10C has a filter size of 3×3 pixels. A filter 1003 shown in FIG. 10D has a filter size of 5×5 pixels.

As described above, according to the second embodiment, filtering processing designated by the user can be performed for the surroundings of a raster not subjected to image formation in an input image. The output image quality around the image-unprintable raster can be changed in accordance with user tastes.

Third Embodiment

An image processing apparatus according to the third embodiment of the present invention will be described. In the following description, a description of the same components as those of the first and second embodiments will be omitted, and the characteristic feature of the third embodiment will be mainly explained.

Figure 12:
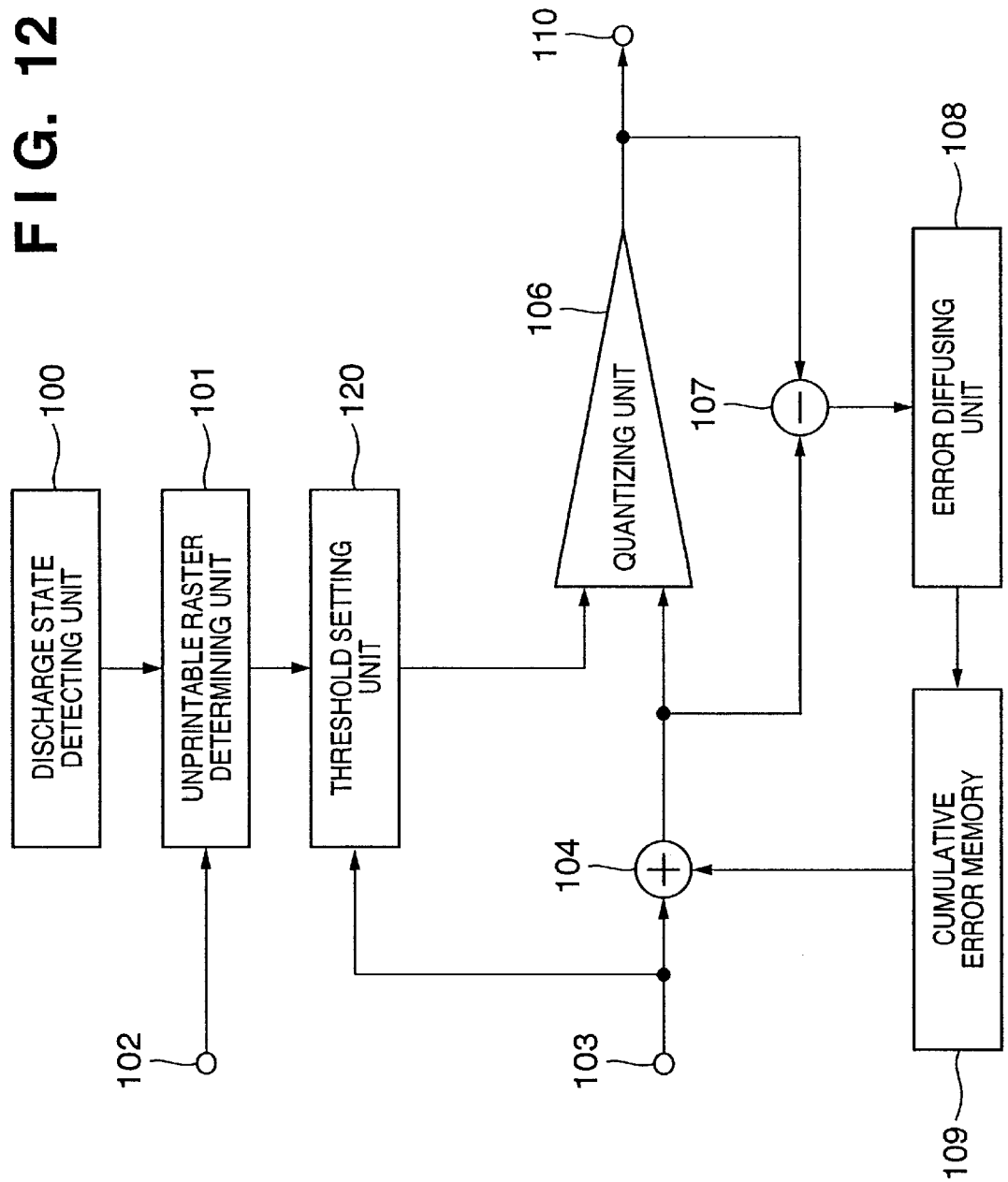
FIG. 12 is a block diagram showing the arrangement of an image processing apparatus according to the third embodiment of the present invention.

FIG. 12 is a block diagram showing the arrangement of an image processing apparatus according to the third embodiment of the present invention. Reference numeral 100 denotes a discharge state detecting unit; 101, an unprintable raster determining unit; 102, an address input terminal; 103, a pixel data input terminal; 104, a cumulative error adding unit; 120, a threshold setting unit which sets a quantization threshold; 106, a quantizing unit; 107, an error calculating unit which calculates a quantization error; 108, an error diffusing unit which diffuses a quantization error; 109, a cumulative error memory; and 110, an output terminal for image data formed after a series of processes.

Figure 13:
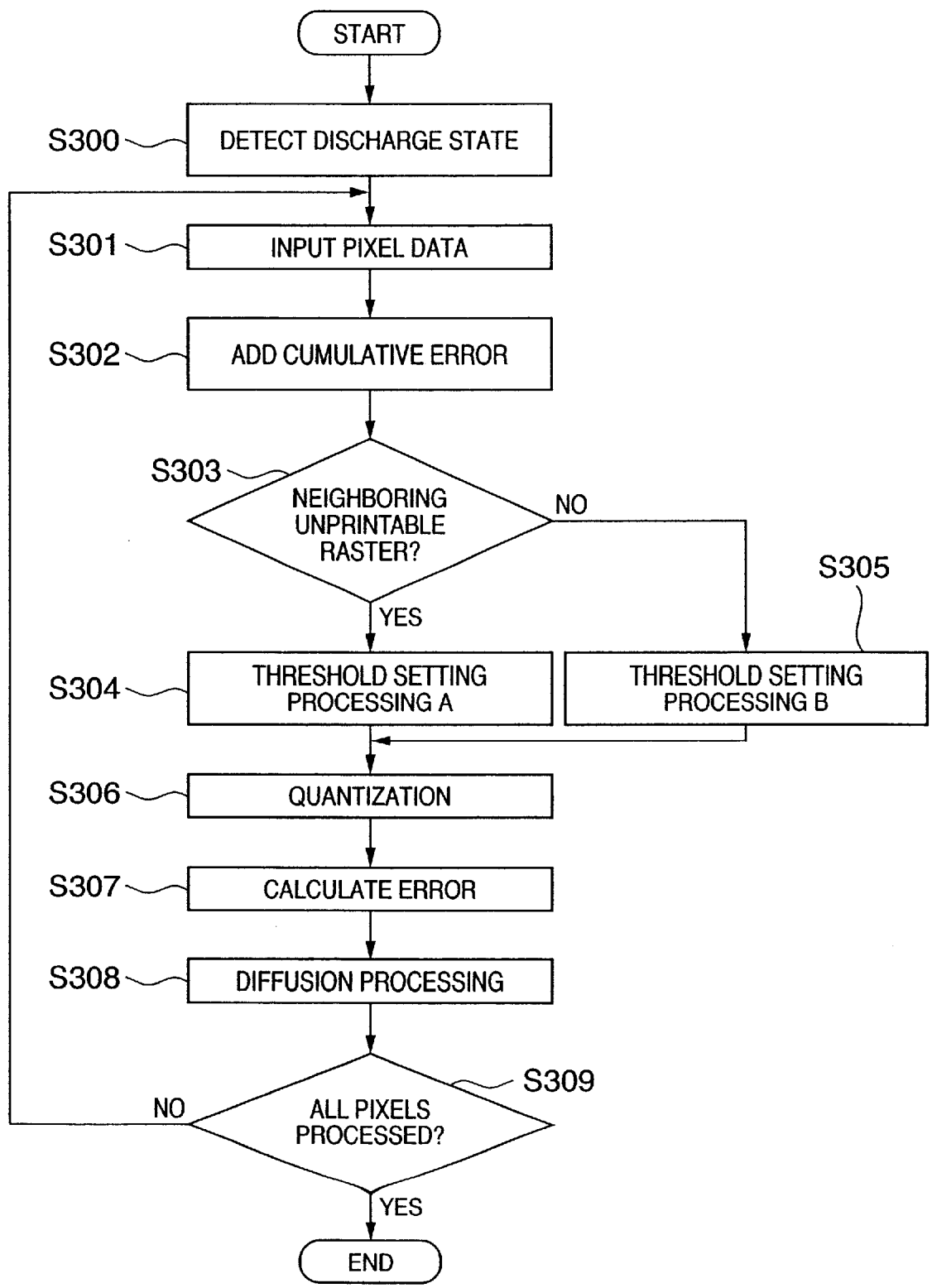
FIG. 13 is a flow chart showing processing in the image processing apparatus of FIG. 12.

The operation of the image processing apparatus in FIG. 12 will be explained with reference to the flow chart of FIG. 13.

The discharge state detecting unit detects the discharge state of each nozzle (step S300). At this time, an unprintable nozzle whose ink droplet discharge amount has not reached a specified value is detected. An image scanning unit (not shown) sequentially scans an input image, and each pixel data is input via the input terminal 103 (step S301).

Scanning of an input image is the same as that of the first embodiment shown in FIG. 3, and a description thereof will be omitted.

The cumulative error adding unit 104 adds, to the input pixel data, a cumulative error value corresponding to a pixel position of the cumulative error memory (step S302). The cumulative error memory has one storage area E0, and storage areas E(x) equal in number to horizontal pixels W of an input image. The cumulative error memory stores a quantization error by a method (to be described later). The cumulative error memory is completely initialized with a default value "0" before the start of processing.

Details of contents stored in the cumulative error memory are the same as those of the first embodiment shown in FIG. 4, and a description thereof will be omitted.

The unprintable raster determining unit 101 refers to the raster number of an image input from the address input terminal 102, and checks whether an unprintable raster in which no image can be formed exists near a raster of interest (step S303). Letting L be the raster number of a raster of interest, N be the number of nozzles of a nozzle array, and Pi be an unprintable nozzle number, a raster which satisfies either one of $$L\%N=(Pi+N-1)\%N$$

$$L\%N=(Pi+1)\%N$$

is determined to have an unprintable raster near it. "%" is an operator representing a modulo (remainder).

The image formation process is also the same as that of the first embodiment shown in FIG. 5, and a description thereof will be omitted.

If an unprintable raster is determined to exist near the raster of interest, the threshold setting unit 120 performs first threshold setting processing A (step S304). If no unprintable raster is determined to exist near the raster of interest, the threshold setting unit 120 performs second threshold setting processing B (step S305).

Each threshold setting processing will be described in detail. In the first threshold setting processing A, a value calculated by adding a variable amount corresponding to an input pixel value to a threshold (reference threshold) serving as a reference is used as a quantization threshold. Assuming that the input pixel value is an integer within the range of 0 to 255, and the reference threshold is 128 which is the median of the input pixel range, a threshold Th(L) is determined by $$Th(L)=128+Th\_v(I)$$

Th_v(I) is a variable amount added to the reference threshold, and is determined in accordance with the input pixel value I. In the third embodiment, the variable amount is defined by $$Th\_v(I)=I/2$$

In the third embodiment, a dot is printed at a pixel position corresponding to an output value "0", and it is not printed at a pixel position corresponding to an output value "255".

Dots cannot be printed in an unprintable raster, generating a raster in which the density is lower than that of a neighboring raster which permits normal dot printing. This leads to a so-called "blank stripe". To relax generation of a blank stripe, the number of dots printed in a raster adjacent to the unprintable raster is increased to compensate for a decrease in density caused by a blank stripe with the density of the adjacent raster.

In the second threshold setting processing B, the quantization threshold is a reference threshold:

$$Th(L)=128$$

After that, the quantizing unit 106 performs quantization processing (step S306). Pixel data I' upon addition of a cumulative error and the threshold Th(L) set by the threshold setting unit 120 are compared to determine an output pixel value. In the third embodiment, the output value after quantization is binary, and an output pixel value is determined by a comparison between the threshold Th(L) and the pixel data I' upon addition of a cumulative error. Assuming that the input pixel value is an integer within the range of 0 to 255, an output tone value O is determined by $$O=0 \ (I'<Th(L))$$

$$O=255 \ (I'=Th(L) \text{ or } I'>Th(L))$$

The error calculating unit 107 calculates the difference between the pixel data I' upon addition of a cumulative error and the output pixel value O, i.e., a quantization error Err by $$Err=I'-O$$

(step S307).

The error diffusing unit 108 performs error diffusion processing (step S308). Details of error diffusion processing are the same as those of the first embodiment, and a description thereof will be omitted.

Consequently, error diffusion processing for one pixel of the input image is completed. Whether error diffusion processing has been performed for all the pixels of the input image is checked (step S309). If YES in step S309, pseudo halftone processing of the input image is completed.

Note that threshold setting processing A in the third embodiment is executed for two rasters adjacent to an unprintable raster. However, the number of rasters is not limited to two as long as they are near an unprintable raster.

In threshold setting processing A of the third embodiment, the variable amount added to the threshold is determined by referring to the input pixel value, but may be a fixed value regardless of the input pixel value.

In the third embodiment, the discharge state detecting unit checks the ink droplet discharge amount of each nozzle to detect an unprintable nozzle. The discharge state detecting unit may detect an unprintable nozzle by giving attention to the printing area of an ink droplet discharged from each nozzle onto a printing medium.

As described above, the third embodiment increases the generation frequency of printing dots in a raster adjacent to a raster in which image formation cannot be executed under the influence of an unprintable nozzle. An abrupt decrease in density by the raster not subjected to image formation can be relaxed, generation of blank stripes can be suppressed, and a high-quality output image can be provided.

Fourth Embodiment

An image processing apparatus according to the fourth embodiment of the present invention will be described. In the following description, a description of the same components as those of the first to third embodiments will be omitted, and the characteristic feature of the fourth embodiment will be mainly explained.

Figure 14:
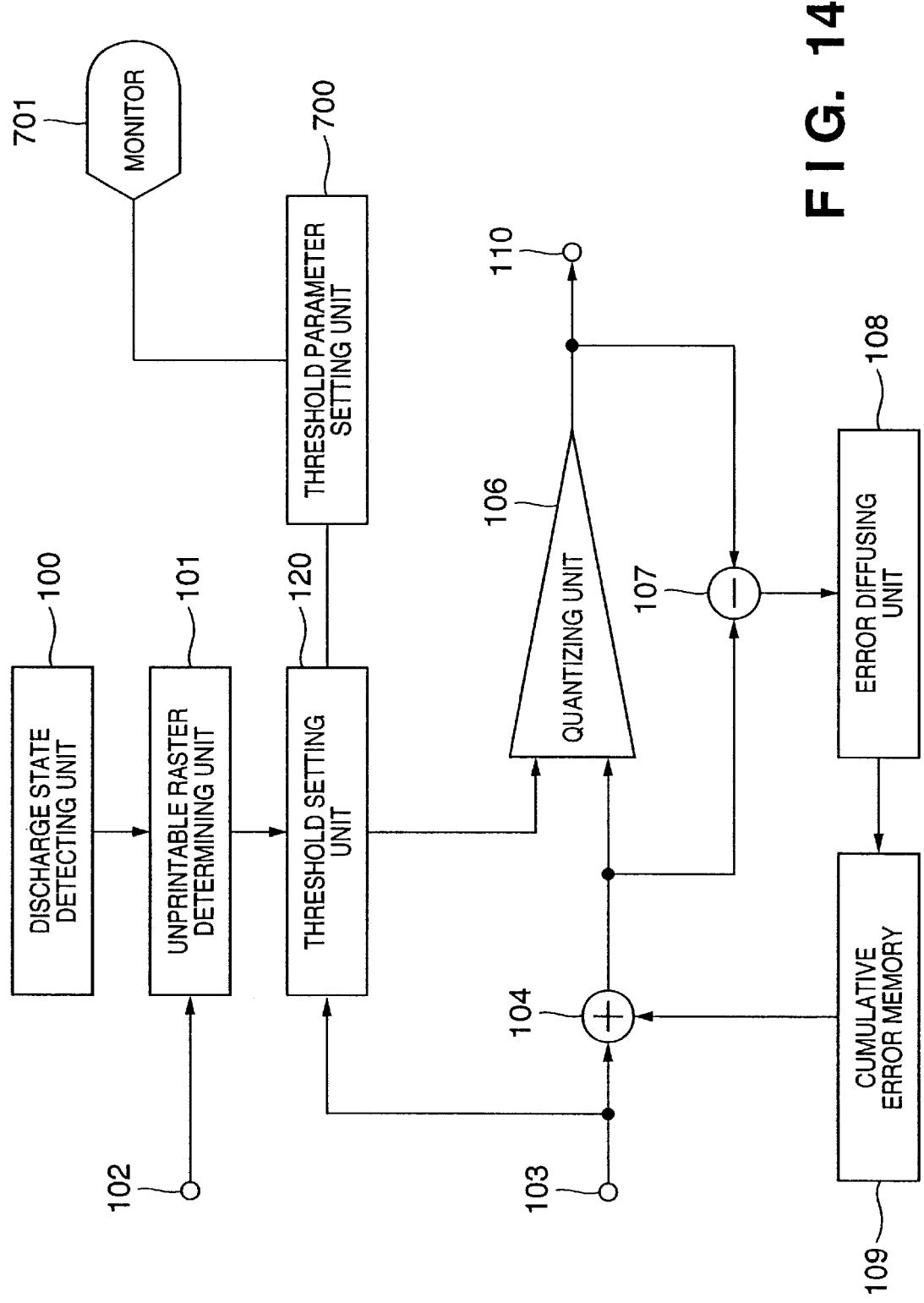
FIG. 14 is a block diagram showing the arrangement of an image processing apparatus according to the fourth embodiment of the present invention.

FIG. 14 is a block diagram showing the arrangement of the image processing apparatus according to the fourth embodiment of the present invention. A threshold parameter setting unit 700 which sets a parameter in setting a threshold, and a monitor 701 for threshold parameter setting are added are added to the arrangement of the third embodiment shown in FIG. 12.

Figure 15:
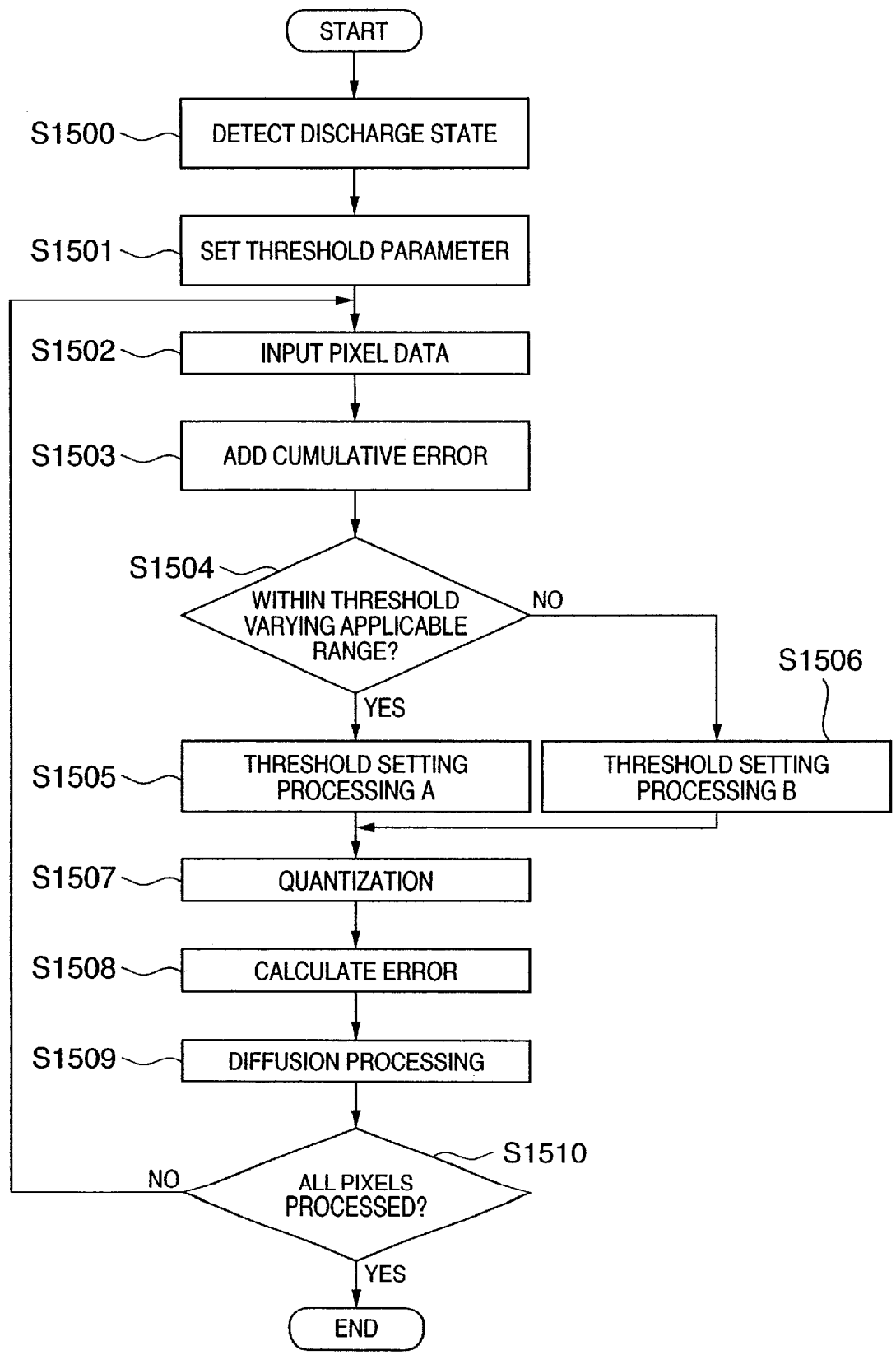
FIG. 15 is a flow chart showing processing in the image processing apparatus of FIG. 14.

The operation of the image processing apparatus in FIG. 14 will be explained with reference to the flow chart of FIG. 15.

A discharge state detecting unit 100 detects the discharge state of each nozzle (step S800). At this time, an unprintable nozzle whose ink droplet discharge amount has not reached a specified value is detected. As threshold parameters, the user designates an applicable range of threshold varying processing executed for a raster near an unprintable raster not subjected to image formation (to be described later), a threshold varying strength, and whether to refer to an input pixel value in threshold setting in the threshold parameter setting unit 700 (step S801).

Figure 16:
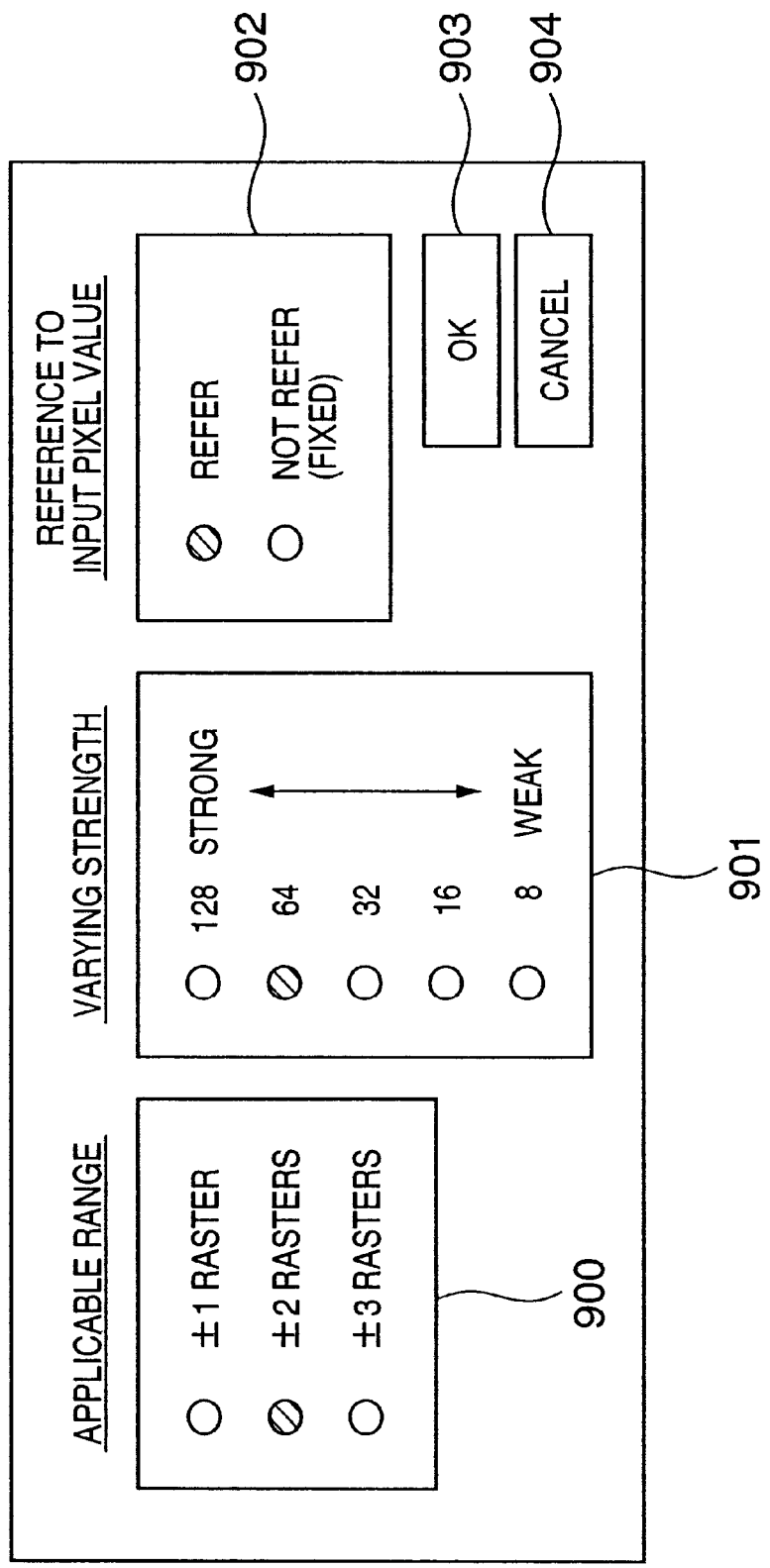
FIG. 16 is a view showing a user interface window for performing threshold parameter setting.

FIG. 16 shows an example of a user interface window used to designate these threshold parameters. The user interface window is displayed on the monitor 701. Reference numeral 900 denotes a threshold varying processing applicable range designating portion; 901, a threshold varying strength designating portion; 902, an input pixel value referring/non-referring designating portion in threshold setting; 903, a threshold parameter setting determining portion; and 904, a threshold parameter setting re-execution determining portion. In the fourth embodiment, as shown in FIG. 16, threshold parameters are designated such that the applicable range of threshold varying processing is +/−2 rasters, the threshold varying strength is 64, and the input pixel value is referred to.

An image scanning unit (not shown) sequentially scans an input image, and each pixel data is input via an input terminal 103 (step S802). Image scanning is the same as that of the first embodiment shown in FIG. 3.

A cumulative error adding unit 104 adds, to the input pixel data, a cumulative error value corresponding to a pixel position of a cumulative error memory (step S803). The cumulative error memory has one storage area E0, and storage areas E(x) equal in number to horizontal pixels W of an input image. The cumulative error memory stores a quantization error, similar to the first embodiment shown in FIG. 4. The cumulative error memory is completely initialized with a default value "0" before the start of processing.

An unprintable raster determining unit 101 refers to the raster number of an image input from an address input terminal 102, and checks whether the raster of interest falls within the threshold varying processing execution range designated at the threshold varying strength designating portion 901 (step S804). Letting L be the raster number of a raster of interest, N be the number of nozzles of a nozzle array, and Pi be an unprintable nozzle number with a threshold varying processing applicable range n of +/−2 rasters, a raster which satisfies $$L \% N = (Pi+n) \% N (n=-2, -1, \ldots, 1, 2)$$

is determined to fall within the threshold varying processing execution range.

The threshold varying processing execution range n corresponds to an applicable range displayed in the user interface window of FIG. 16. When the applicable range is set to +/−1 raster in the window 900, the applicable range n is equal to or greater than −1 and equal to or less than +1, and when the applicable range is set to +/−3 rasters in the window 900, the applicable range n is equal to or greater than −3 and equal to or less than +3, where "%" is an operator representing a modulo (remainder).

Assume that a nozzle array having the number N of nozzles=16 and unprintable nozzle numbers P0=3 and P1=11, as shown in FIG. 5, is used similarly to the first embodiment. In the fourth embodiment, the applicable range of threshold varying processing is set to +/−(plus/minus) 2 rasters around an unprintable raster. Hence, rasters with the output image raster number L=1, 2, 4, 5, 9, 10, 12, 13, 17, 18, 20, 21, . . . are subjected to threshold varying processing.

If the raster of interest is determined to fall within the applicable range of threshold varying processing, the threshold setting unit 120 performs first threshold setting processing A (step S805). If the raster of interest is determined not to fall within the applicable range, the threshold setting unit 120 performs second threshold setting processing B (step S806).

Each threshold setting processing will be described in detail. In the first threshold setting processing A, a value calculated by adding a variable amount set at the threshold varying strength designating portion 901 to a reference threshold is used as a quantization threshold. Assuming that the input pixel value is an integer within the range of 0 to 255, and the reference threshold is 128 which is the median of the input pixel range, a threshold Th(L) is determined by $$Th(L)=128+Th\_v(I)$$

Th_v(I) is a variable amount added to the reference threshold, and is determined on the basis of a threshold varying strength V set at the threshold varying strength designating portion 901 and a setting result at the input pixel value referring/non-referring designating portion 902. In the fourth embodiment, the threshold varying strength V is set to 64, and the input pixel value I is set to be referred to. The variable amount is defined by $$Th\_v(I)=I \times V/255 (V=64)$$

The threshold varying strength V corresponds to a varying strength designated in the user interface window of FIG. 16. The varying strength is set to 128 to define V=128, 32 to define V=32, 16 to define V=16, and 8 to define V=8.

If the input image value is set not to be referred to at the input pixel value referring/non-referring designating portion 902, the variable amount added to the reference threshold is given by $$Th\_v(I)=V/255$$

regardless of the input pixel value I.

In the fourth embodiment, a dot is printed at a pixel position corresponding to an output value "0", and it is not printed at a pixel position corresponding to an output value "255".

Dots cannot be printed in an unprintable raster, generating a raster in which the density is lower than that of a neighboring raster which permits normal dot printing. This leads to a so-called "blank stripe". To relax generation of a blank stripe, threshold setting processing A of adjusting the threshold varying amount which determines the generation frequency of printing dots in accordance with parameters designated by the user with respect to several rasters around an unprintable raster is executed.

In the second threshold setting processing B, the quantization threshold is a reference threshold:

$$Th(L)=128$$

Then, a quantizing unit 106 performs quantization processing (step S807). This processing is the same as that of step S306 in the third embodiment, and a description thereof will be omitted.

An error calculating unit 107 calculates the difference between the pixel data I' upon addition of a cumulative error and the output pixel value O, i.e., a quantization error Err by $$Err=I'-O$$

(step S808).

An error diffusing unit 108 performs error diffusion processing in accordance with the horizontal position x of the pixel of interest (step S809). This processing is the same as that of step S207 in the first embodiment, and a description thereof will be omitted.

In this way, error diffusion processing for one pixel of the input image is completed. Whether error diffusion processing has been performed for all the pixels of the input image is checked (step S810). If YES in step S810, pseudo halftone processing of the input image is completed.

In the fourth embodiment, the discharge state detecting unit checks the ink droplet discharge amount of each nozzle to detect an unprintable nozzle. The discharge state detecting unit may detect an unprintable nozzle by giving attention to the printing area of an ink droplet discharged from each nozzle onto a printing medium.

As described above, according to the fourth embodiment, the output image quality can be changed in accordance with user tastes by the user designating a threshold varying amount in quantization for a raster falling within a designated range apart from a raster in which image formation cannot be executed under the influence of an unprintable nozzle.

Other Embodiment

The above-described embodiments have exemplified an image processing apparatus for a printing apparatus using an ink-jet printing method in which a printhead having a plurality of nozzles arrayed in a predetermined direction scans a printing medium in a direction crossing to the nozzle array direction, and ink is discharged onto the printing medium to form an image. The present invention can also be applied to a printing apparatus which performs printing in accordance with a method other than the ink-jet method. In this case, a nozzle which discharges ink droplets corresponds to a printing element which performs printing dots.

The present invention can also be applied to a printing apparatus, other than a serial printing apparatus (printer) which performs printing by moving a printhead relative to a printing medium, such as a so-called full-line printing apparatus which has a printhead with a length corresponding to, e.g., the printing width of a printing medium and performs printing by moving the printhead relative to the printing medium.

In the above-described embodiments, the image processing apparatus comprises the discharge state detecting unit which detects the discharge state of each nozzle of the printhead. Alternatively, the discharge state may be detected by another apparatus as far as the image processing apparatus can recognize the position (number) of a nozzle which cannot print normally. In this case, the apparatus which detects the discharge state transmits, to the image processing apparatus, data about the position or number of a nozzle which cannot print normally. The received data is stored at a predetermined memory position in the image processing apparatus.

The above-described embodiments have exemplified an arrangement having a printhead with one nozzle array. In an arrangement of performing color printing using nozzle arrays corresponding to ink types, each nozzle array executes processing described in each embodiment for data to be printed.

The present invention can be applied to a system comprising a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides having the aforesaid functions according to the above embodiments being realized by executing the program codes which are read by a computer, the present invention also includes the case where an OS (operating system) or the like working on the computer performs parts or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

If the present invention is implemented in the form of a storage medium, program codes corresponding to the above mentioned flowcharts (FIG. and/or FIG.) are to be stored in the storage medium.

As is apparent, many different embodiments of the present invention can be made without departing from the spirit and scope thereof, so it is to be understood that the invention is not limited to the specific embodiments thereof except as defined in the appended claims.

What is claimed is:

1. An image processing apparatus for a printing apparatus which performs printing by moving a printhead having a plurality of printing elements arrayed in a predetermined direction, relative to a printing medium, comprising:

determining means for determining whether input pixel data is pixel data to be printed by a printing element which cannot print normally;

quantizing means for converting input multilevel data of each pixel into data of a smaller number of gray levels than the number of input gray levels; and error diffusing means for diffusing a difference between input data and data quantized by said quantizing means for a pixel of interest to pixels around the pixel of interest, wherein said quantizing means performs, for the pixel data determined by said determining means to be printed by the printing element which cannot print normally, quantization processing different from quantization processing for other pixel data.

2. The apparatus according to claim 1, wherein said quantizing means converts the pixel data determined by said determining means to be printed by the printing element which cannot print normally into data representing non-printing.

3. The apparatus according to claim 1, further comprising filter means for performing a predetermined filter process for input pixel data before input to said quantizing means.

4. The apparatus according to claim 3, further comprising a user interface for allowing a user to select the predetermined filter process from a plurality of filter processes.

5. The apparatus according to claim 4, wherein the plurality of filter processes are different in at least one of a range for performing the predetermined filter process and a filter characteristic.

6. The apparatus according to claim 4, further comprising filter storage means for storing parameters of the plurality of filter processes.

7. The apparatus according to claim 3, wherein said filter means performs the predetermined filter process for pixels around the pixel determined to be subjected to printing by the printing element which cannot print normally.

8. The apparatus according to claim 1, further comprising detecting means for detecting the printing element which cannot print normally.

9. The apparatus according to claim 8, wherein said detecting means detects the printing element which cannot print normally, on the basis of a driving result of each printing element.

10. The apparatus according to claim 8, wherein said detecting means detects the printing element which cannot print normally, on the basis of a printing result on a printing medium by each printing element.

11. The apparatus according to claim 1, wherein the printing apparatus performs printing by scanning the printhead over a printing medium in a direction crossing to the direction of the array of the printing elements.

12. The apparatus according to claim 1, wherein the printhead includes an ink-jet printhead which performs printing by discharging ink.

13. An image processing method for a printing apparatus which performs printing by moving a printhead having a plurality of printing elements arrayed in a predetermined direction, relative to a printing medium, comprising:

a determining step of determining whether input pixel data is pixel data to be printed by a printing element which cannot print normally;

a quantizing step of converting input multilevel data of each pixel into data of a smaller number of gray levels than the number of input gray levels; and an error diffusing step of diffusing a difference between input data and data quantized in the quantizing step for a pixel of interest to pixels around the pixel of interest, wherein in the quantizing step, the pixel data determined in the determining step to be printed by the printing element which cannot print normally undergoes quantization processing different from quantization processing for other pixel data.

14. The method according to claim 13, wherein in the quantizing step, the pixel data determined in the determining step to be printed by the printing element which cannot print normally is converted into data representing non-printing.

15. The method according to claim 13, further comprising the filter step of performing a predetermined filter process for input pixel data before the quantizing step.

16. The method according to claim 15, further comprising the selecting step of allowing a user to select the predetermined filter process from a plurality of filter processes via a user interface.

17. The method according to claim 15, wherein in the filter step, the predetermined filter process is performed for pixels around the pixel determined to be subjected to printing by the printing element which cannot print normally.

18. The method according to claim 16, wherein the plurality of filter processes are different in at least one of a range for performing the predetermined filter process and a filter characteristic.

19. The method according to claim 13, further comprising the detecting step of detecting the printing element which cannot print normally.

20. A computer program which causes a computer to execute an image processing method for a printing apparatus which performs printing by moving a printhead having a plurality of printing elements arrayed in a predetermined direction, relative to a printing medium, comprising program codes corresponding to:

a determining step of determining whether input pixel data is pixel data to be printed by a printing element which cannot print normally;

a quantizing step of converting input multilevel data of each pixel into data of a smaller number of gray levels than the number of input gray levels; and an error diffusing step of diffusing a difference between input data and data quantized in the quantizing step for a pixel of interest to pixels around the pixel of interest, wherein in the quantizing step, the pixel data determined in the determining step to be printed by the printing element which cannot print normally undergoes quantization processing different from quantization processing for other pixel data.

21. A storage medium storing a computer program which causes a computer to execute an image processing method for a printing apparatus which performs printing by moving a printhead having a plurality of printing elements arrayed in a predetermined direction, relative to a printing medium, which stores program codes corresponding to:

a determining step of determining whether input pixel data is pixel data to be printed by a printing element which cannot print normally;

a quantizing step of converting input multilevel data of each pixel into data of a smaller number of gray levels than the number of input gray levels; and an error diffusing step of diffusing a difference between input data and data quantized in the quantizing step for a pixel of interest to pixels around the pixel of interest, wherein in the quantizing step, the pixel data determined in the determining step to be printed by the printing element which cannot print normally undergoes quantization processing different from quantization processing for other pixel data.

22. An image processing apparatus for a printing apparatus which performs printing by moving a printhead having a plurality of printing elements arrayed in a predetermined direction, relative to a printing medium, comprising:

determining means for determining whether input pixel data is data of a pixel to be printed by a printing element which cannot print normally;

quantizing means for converting input multilevel data of each pixel into data of a smaller number of gray levels than the number of input gray levels; and error diffusing means for diffusing a difference between input data and data quantized by said quantizing means for a pixel of interest to pixels around the pixel of interest, wherein said quantizing means performs, for data of a pixel neighboring the pixel determined by said determining means to be subjected to printing by the printing element which cannot print normally, quantization processing different from quantization processing for other pixel data.

23. The apparatus according to claim 22, wherein said quantizing means comprises threshold varying means for varying a quantization threshold for data of the neighboring pixel.

24. The apparatus according to claim 23, wherein said threshold varying means varies the threshold so as to increase the number of printing dots to the neighboring pixel.

25. The apparatus according to claim 23, further comprising a user interface for allowing a user to select a parameter used by said threshold varying means.

26. The apparatus according to claim 25, wherein the parameter includes an applicable range of threshold varying processing, a threshold varying strength, and whether to refer to an input pixel value in threshold setting.

27. The apparatus according to claim 23, wherein said threshold varying means defines a threshold varying amount by referring to input pixel data.

28. The apparatus according to claim 22, further comprising detecting means for detecting the printing element which cannot print normally.

29. The apparatus according to claim 28, wherein said detecting means detects the printing element which cannot print normally, on the basis of a driving result of each printing element.

30. The apparatus according to claim 28, wherein said detecting means detects the printing element which cannot print normally, on the basis of a printing result on a printing medium by each printing element.

31. The apparatus according to claim 22, wherein the printing apparatus performs printing by scanning the printhead over a printing medium in a direction crossing to the direction of the array of the printing elements.

32. The apparatus according to claim 22, wherein the printhead includes an ink-jet printhead which performs printing by discharging ink.

33. An image processing method for a printing apparatus which performs printing by moving a printhead having a plurality of printing elements arrayed in a predetermined direction, relative to a printing medium, comprising:

a determining step of determining whether input pixel data is data of a pixel to be printed by a printing element which cannot print normally;

a quantizing step of converting input multilevel data of each pixel into data of a smaller number of gray levels than the number of input gray levels; and an error diffusing step of diffusing a difference between input data and data quantized in the quantizing step for a pixel of interest to pixels around the pixel of interest, wherein in the quantizing step, data of a pixel neighboring the pixel determined in the determining step to be subjected to printing by the printing element which cannot print normally undergoes quantization processing different from quantization processing for other pixel data.

34. The method according to claim 33, wherein the quantizing step comprises the threshold varying step of varying a quantization threshold for data of the neighboring pixel.

35. The method according to claim 34, wherein in the threshold varying step, the threshold is so varied as to increase printing dots to the neighboring pixel.

36. The method according to claim 34, further comprising a user interface for allowing a user to select a parameter used in the threshold varying step.

37. The method according to claim 36, wherein the parameter includes an applicable range of threshold varying processing, a threshold varying strength, and whether to refer to an input pixel value in threshold setting.

38. The method according to claim 34, wherein in the threshold varying step, a threshold varying amount is defined by referring to input pixel data.

39. The method according to claim 33, further comprising the detecting step of detecting the printing element which cannot print normally.

40. A computer program which causes a computer to execute an image processing method for a printing apparatus which performs printing by moving a printhead having a plurality of printing elements arrayed in a predetermined direction, relative to a printing medium, comprising program codes corresponding to:

a determining step of determining whether input pixel data is data of a pixel to be printed by a printing element which cannot print normally;

a quantizing step of converting input multilevel data of each pixel into data of a smaller number of gray levels than the number of input gray levels; and an error diffusing step of diffusing a difference between input data and data quantized in the quantizing step for a pixel of interest to pixels around the pixel of interest, wherein in the quantizing step, data of a pixel neighboring the pixel determined in the determining step to be subjected to printing by the printing element which cannot print normally undergoes quantization processing different from quantization processing for other pixel data.

41. A storage medium storing a computer program which causes a computer to execute an image processing method for a printing apparatus which performs printing by moving a printhead having a plurality of printing elements arrayed in a predetermined direction, relative to a printing medium, which stores program codes corresponding to:

a determining step of determining whether input pixel data is data of a pixel to be printed by a printing element which cannot print normally;

a quantizing step of converting input multilevel data of each pixel into data of a smaller number of gray levels than the number of input gray levels; and an error diffusing step of diffusing a difference between input data and data quantized in the quantizing step for a pixel of interest to pixels around the pixel of interest, wherein in the quantizing step, data of a pixel neighboring the pixel determined in the determining step to be subjected to printing by the printing element which cannot print normally undergoes quantization processing different from quantization processing for other pixel data.

* * * * *

UNITED STATES PATENT AND TRADEMARK OFFICE
CERTIFICATE OF CORRECTION

PATENT NO. : 6,652,059 B2  Page 1 of 1
DATED : November 25, 2003
INVENTOR(S) : Tsutsumi, et al.

It is certified that error appears in the above-identified patent and that said Letters Patent is hereby corrected as shown below:

Column 7,
Lines 57-67,

" $E(x+1) \rightarrow E(x+1) + E \times 7/16$  (x<W)
$E(x-1) \rightarrow E(x-1) + E \times 3/16$  (x>1)
$E(x) \rightarrow E0 + E \times 5/16$  (1<x<W)
$E(x) \rightarrow E0 + E \times 8/16$  (x=1)
$E(x) \rightarrow E0 + E \times 13/16$  (x=W)
$E0 \rightarrow E \times 1/16$  (x<W)
$E0 \rightarrow 0$  (x=W)"

should read

-- $E(x+1) \leftarrow E(x+1) + E \times 7/16$  (x<W)
$E(x-1) \leftarrow E(x-1) + E \times 3/16$  (x>1)
$E(x) \leftarrow E0 + E \times 5/16$  5/16  (1<x<W)
$E(x) \leftarrow E0 + E \times 8/16$  (x=1)
$E(x) \leftarrow E0 + E \times 13/16$  (x=W)
$E0 \leftarrow E \times 1/16$  (x<W)
$E0 \leftarrow 0$  (x=W)--

Signed and Sealed this

Twenty-second Day of June, 2004

JON W. DUDAS
*Acting Director of the United States Patent and Trademark Office*